United States Patent
Kisela et al.

(10) Patent No.: US 9,581,482 B2
(45) Date of Patent: Feb. 28, 2017

(54) FLUID FLOW TESTING FOR COMPARING CONTAINER POUR PROFILES

(71) Applicant: Owens-Brockway Glass Container Inc., Perrysburg, OH (US)

(72) Inventors: David Kisela, Sylvania, OH (US); Gerald L Ames, Holland, OH (US); Marvin Karl Himmelein, Perrysburg, OH (US); James Edward Gerdeman, Toledo, OH (US); Peter Miller, Camdem, MI (US); Daniel S Sabo, Dublin, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 345 days.

(21) Appl. No.: 14/294,835

(22) Filed: Jun. 3, 2014

(65) Prior Publication Data

US 2015/0346008 A1    Dec. 3, 2015

(51) Int. Cl.
  *G01F 9/00* (2006.01)
  *G01G 17/06* (2006.01)
  *G01F 1/00* (2006.01)
  *G01F 23/20* (2006.01)

(52) U.S. Cl.
  CPC .............. *G01F 9/003* (2013.01); *G01G 17/06* (2013.01); *G01F 1/007* (2013.01); *G01F 23/20* (2013.01)

(58) Field of Classification Search
  CPC .......... G01F 9/003; G01F 1/007; G01F 23/20; G01G 17/06
  USPC ......................................................... 222/58
  See application file for complete search history.

(56) References Cited

U.S. PATENT DOCUMENTS

| | | | | |
|---|---|---|---|---|
| 2,191,918 A | * | 2/1940 | Stadtfeld | B67D 1/04 222/131 |
| 2,674,640 A | * | 4/1954 | Tama | B22D 17/30 164/336 |
| 3,341,073 A | * | 9/1967 | Arps | B67D 3/00 222/129.4 |
| 3,578,094 A | * | 5/1971 | Henry | G01G 21/00 177/108 |

(Continued)

FOREIGN PATENT DOCUMENTS

| | | |
|---|---|---|
| CA | 2734656 | 9/2012 |
| JP | 2002062238 A | 2/2002 |

(Continued)

OTHER PUBLICATIONS

PCT Int. Search Report and Written Opinion, Int. Serial No. PCT/US2015/030832, Int. Filing Date: May 14, 2015, Applicant: Owens-Brockway Glass Container Inc., Mail Date: Aug. 11, 2015.

*Primary Examiner* — David Bolduc

(57) ABSTRACT

A fluid flow testing apparatus for measuring the pour profile of a container has a rotatable container carrier and an assembly for rotating the container between a first position allowing fluid to be retained within the container and a second position causing fluid to be poured from the container. Sensors for sensing the weight of the container as liquid is poured from the container are provided in order to determine the pour profile of the container. A controller receives input signals from the sensors in order to record the weight of the container over time as liquid is poured from the container as the container is rotated. The change of weight of the container over time establishes a pour profile for the container.

18 Claims, 6 Drawing Sheets

(56) References Cited

U.S. PATENT DOCUMENTS

| | | | |
|---|---|---|---|
| 3,868,047 A | | 2/1975 | Bersano |
| 4,281,729 A | | 8/1981 | Farley et al. |
| 4,944,428 A | * | 7/1990 | Gmur .................. G01G 11/003 177/50 |
| 5,040,699 A | * | 8/1991 | Gangemi ................ A61J 3/002 141/104 |
| 5,115,842 A | * | 5/1992 | Crafts .................. B67D 3/0003 141/113 |
| 6,279,622 B1 | * | 8/2001 | Nguyen ................ A61L 2/186 141/5 |
| 7,410,623 B2 | * | 8/2008 | Mehus ................ B01F 1/0027 222/77 |
| 8,118,318 B1 | | 2/2012 | Chauza |
| 9,102,509 B2 | * | 8/2015 | Buck .................. A47L 15/0055 |
| 2004/0099690 A1 | | 5/2004 | Elliott et al. |
| 2008/0142549 A1 | | 6/2008 | Kosich |
| 2009/0314101 A1 | * | 12/2009 | Levine .................... A61F 5/44 73/861.08 |
| 2010/0006599 A1 | | 1/2010 | Cebulski |
| 2011/0165034 A1 | | 7/2011 | Carlson et al. |

FOREIGN PATENT DOCUMENTS

| | | |
|---|---|---|
| JP | 3479456 B2 | 12/2003 |
| JP | 3485821 B2 | 1/2004 |

\* cited by examiner

FLUID FLOW TESTING FOR COMPARING CONTAINER POUR PROFILES

The present disclosure is directed to containers, and more particularly to the measurement of fluid flow characteristics from a container.

BACKGROUND AND SUMMARY OF THE DISCLOSURE

A general object of the present disclosure, in accordance with one aspect of the disclosure, is to provide a method and system to characterize the flow of liquid from a container, for example, to establish the attributes of the pour profile of the container.

The present disclosure embodies a number of aspects that can be implemented separately from or in combination with each other.

A container test system in accordance with one aspect of the disclosure includes a test chamber including rotatable container carrier, and an assembly for rotating the container between upright and inverted positions. The system also includes sensors to measure the change of the weight of the container as fluid is poured from the container. The system further includes a collection assembly for gathering the liquid that flows from the inverted or partially inverted container. Lastly, the system further includes data collection capability to gather and process sensor data in real-time while the system also includes sensors to monitor any external conditions that may affect the test so that the data may be adjusted to compensate for such external conditions.

In accordance with another aspect of the disclosure, there is provided a method of determining the pour profile of a container. The method includes positioning the container on a rotatable container carrier, and rotating the container between an upright and an inverted position. The method further includes reading load cells to measure the change in weight of the container during rotation while the fluid contents are poured from the inside of the container, and reading an accelerometer to monitor and detect any outside environmental interference that may influence the results of the test, and adjusting the test results for such outside interference.

BRIEF DESCRIPTION OF THE DRAWINGS

The disclosure, together with additional objects, features, advantages and aspects thereof, will be best understood from the following description, the appended claims and the accompanying drawings, in which:

apparatus

DETAILED DESCRIPTION

Figure 1:
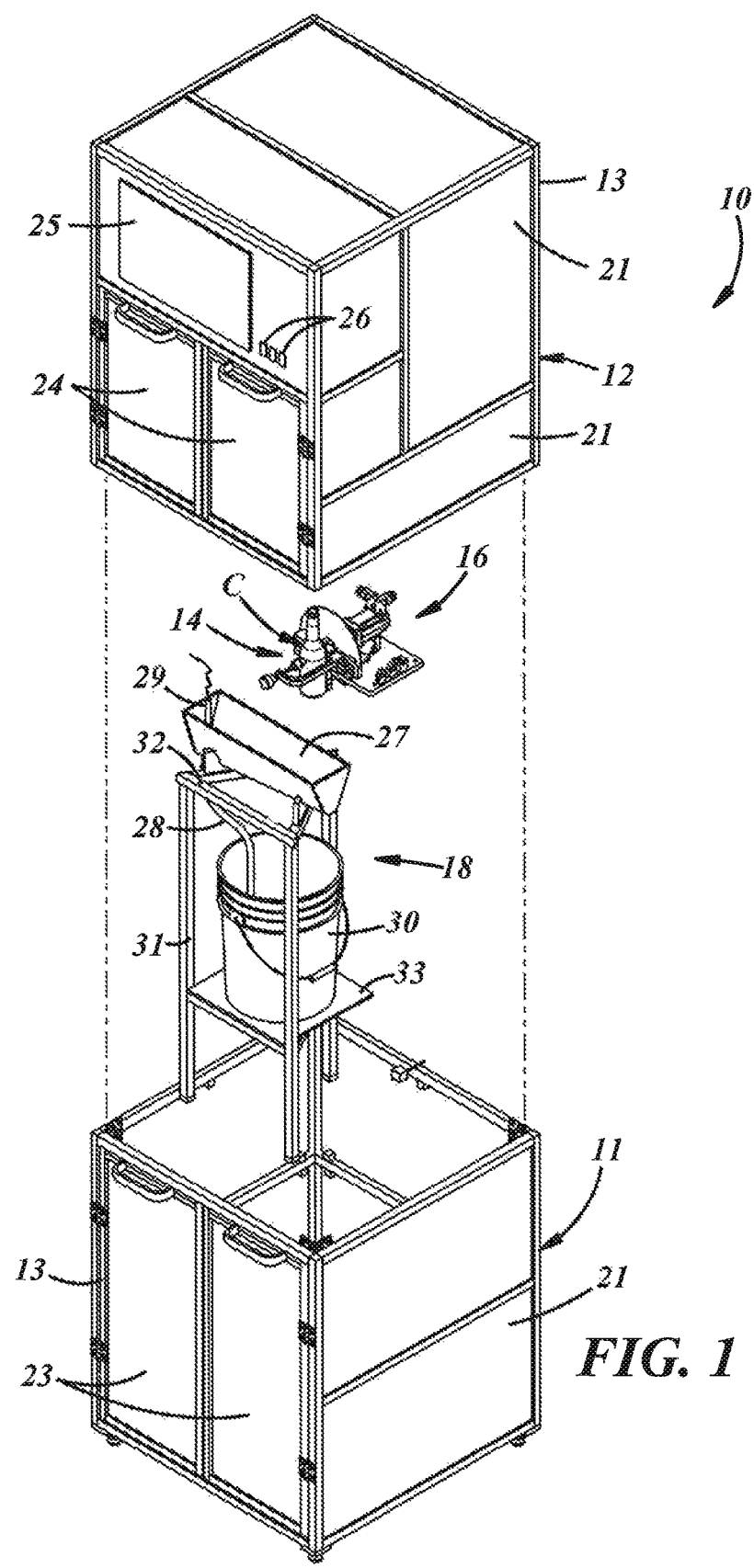
FIG. 1 is an exploded, perspective view of a fluid flow test apparatus in accordance with an illustrative embodiment of the present disclosure.

Referring generally to FIG. 1, there is illustrated a fluid flow test apparatus 10 to assess fluid flow characteristics of a container C. In general, the apparatus 10 may include a lower cabinet 11 and an upper cabinet 12 that may comprise a support frame 13 to support portions of the apparatus 10, a rotatable container carrier assembly 14, a prime mover assembly 16, and a collection assembly 18. The support frame 13 may support a number of exterior panels 21 which may be fixed, and a number of doors 23 and 24 which may provide access to the interior of the apparatus. Lower doors 23 may be provided on the lower cabinet 11 to provide access to the collection assembly 18, and upper doors 24 may be provided on the upper cabinet 12 to provide access to the rotatable container carrier assembly 14 and the prime mover assembly 16. A touch screen computer 25 may provided for controlling the operation of the apparatus 10 through the touch screen 25. External computer ports 26 may be provided to interface to an external keyboard and/or mouse as an additional option for controlling the operation of the apparatus. The collection assembly 18 may comprise a trough 27 or other device to receive the contents of the inverted container C, and a trough drain hose 28 having a first end connected to an outlet from the trough 27 and a second end leading to a collection device such as a bucket 30. The trough 27 and the bucket 30 may be supported on a collection assembly frame 31 which may have top support frame members 32 that may support the trough 27 and a lower shelf 33 that may support the bucket 30. A temperature sensor such as a thermocouple 29 may be positioned in the trough 27 where it comes into contact with the fluid steam in the trough 27 to record the temperature of the fluid at the time of testing. Other sensors recording environmental conditions such as vibrations, ambient temperature, relative humidity, and barometric pressure may be incorporated in the apparatus as described below to record these conditions at the time of each individual pour test.

FIG. 1 shows the apparatus 10 in an exploded condition for clarity, but it will be understood that in an operative orientation, the collection assembly 18 may be positioned in the lower cabinet 11, and the bucket 30 and the trough 27 may be in approximate alignment with the lower doors 23 of the lower cabinet 11 for routine access for performing fluid flow tests, and for service and maintenance purposes. In a similar manner, the rotatable container carrier assembly 14 and the prime mover assembly 16 may be supported on frame members (not shown) so as to be in approximate alignment with the upper doors 24 in the upper cabinet 12 in order to provide access to the rotatable container carrier assembly 14 for performing fluid flow tests, and for service and maintenance purposes.

Figure 3:
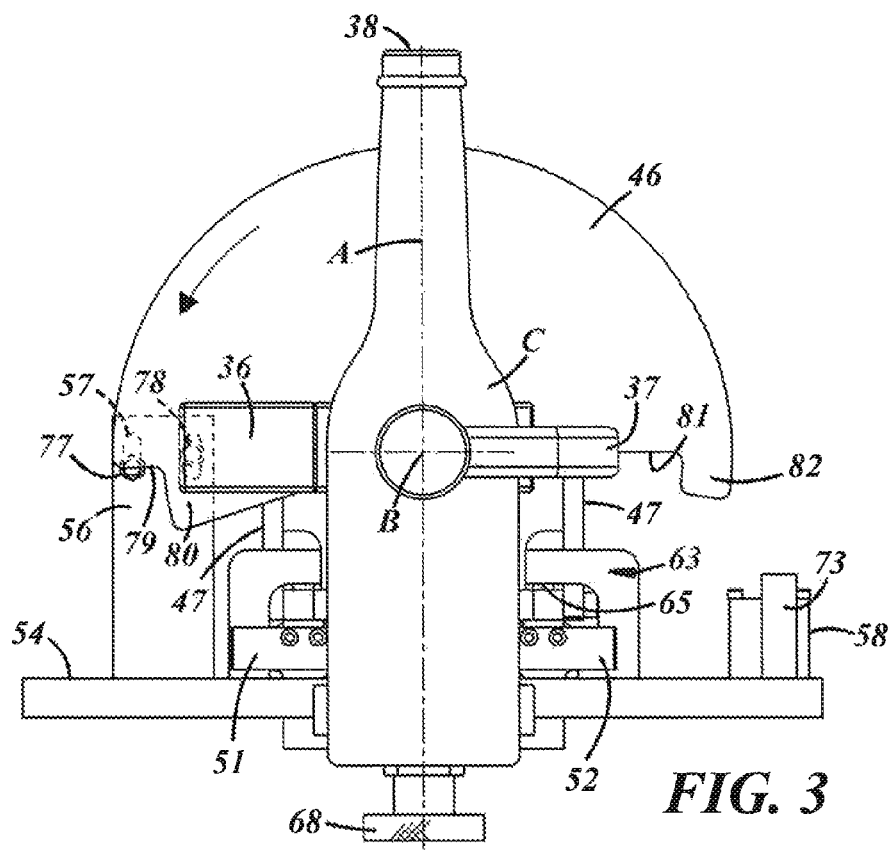
FIG. 3 is a front view of apparatus of FIG. 2 showing the rotatable container carrier assembly.
Figure 4:
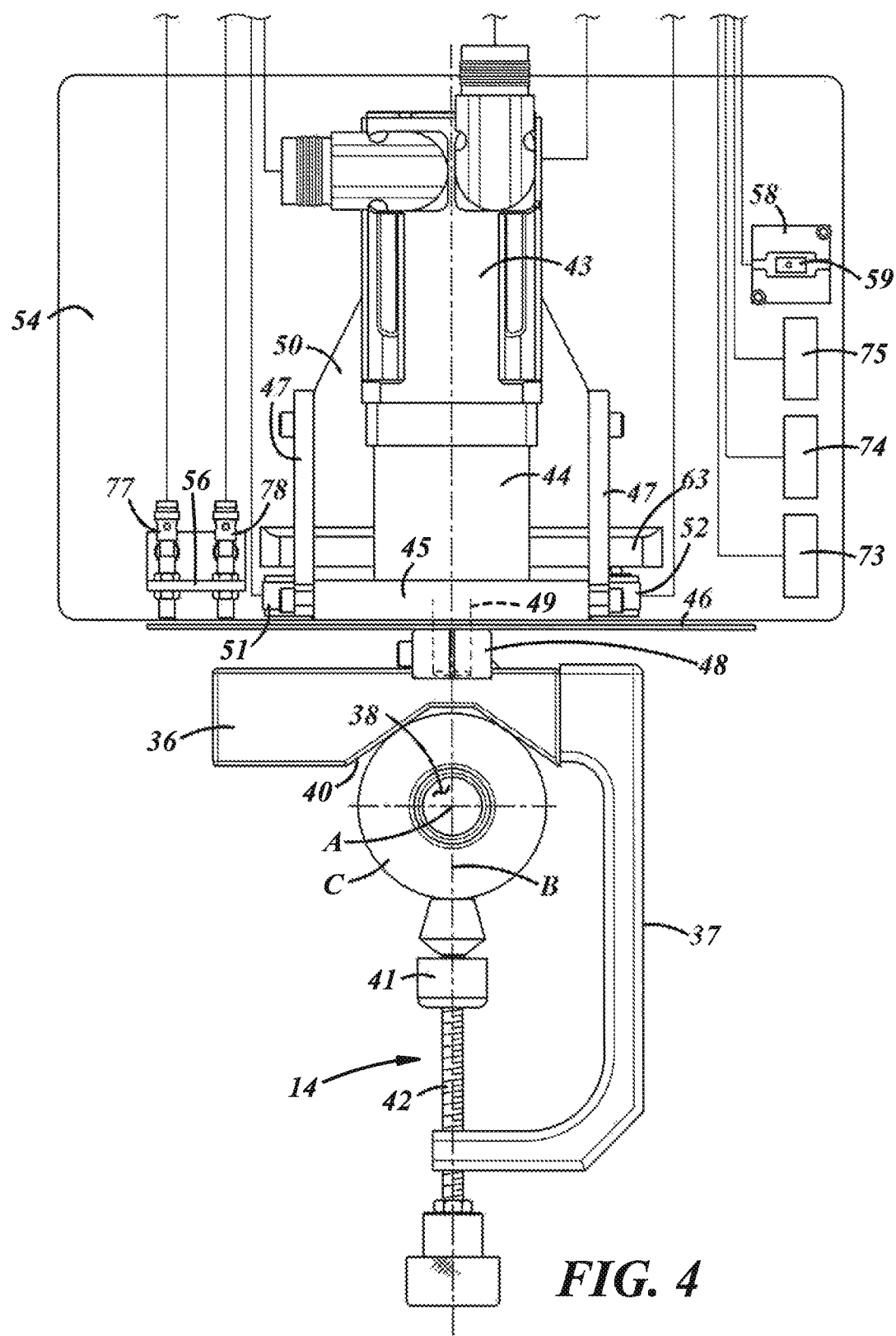
FIG. 4 is a top view of apparatus of FIG. 3 showing the rotatable container carrier assembly and the prime mover assembly.
Figure 5:
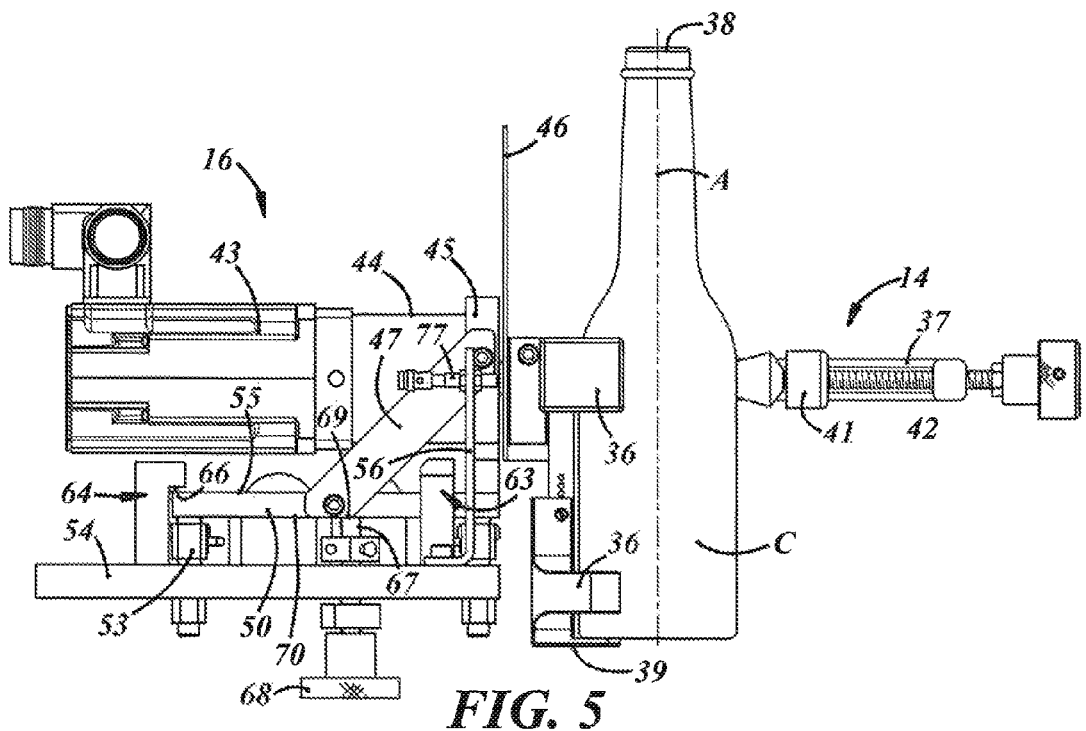
FIG. 5 is a left side view of apparatus of FIG. 3 showing the rotatable container carrier assembly and the prime mover assembly.

FIGS. 2-7 are detail views of the rotatable container carrier assembly 14 and the prime mover assembly 16. The rotatable container carrier assembly 14 may include a cradle 36 for supporting the container C, a clamp arm 37 that may extend away from the cradle 36, and a movable pressure member 41 mounted on the end of a threaded rod 42 that may be carried by the clamp arm 37. The position of the movable pressure member 41 may be adjusted toward the container C to secure the container C to the cradle 36. The cradle 36 may include a lower support shelf 39 as shown in FIG. 5 that supports the container C, and a backrest 40 that may be contoured to receive the outer shape of the container C and to center the container C so that the longitudinal axis A of the container C is in approximate alignment with the axis of rotation B of the rotatable container carrier assembly 14. Although the structure for securing the container C to the cradle 36 is shown as a threaded rod 42 that may be tightened against the container C, other securing devices may be employed; for example, for example, the container C may be held by a spring loaded grippers, or a vacuum holding device, or a strap or a link belt with a buckle, a tie, or other mechanical, magnetic, or adhesive fastener. The container C has a mouth opening 38.

The prime mover assembly 16 may be coupled to the rotatable container carrier assembly 14 in order to rotate the rotatable container carrier assembly 14 about the axis of rotation B. As viewed in FIG. 3, the rotatable container carrier assembly 14 may rotate in a counterclockwise direction around the axis B. The prime mover assembly 16 may include a servo motor 43 and a servo reducer 44 with a motor mounting plate 45. The servo motor 43 may be a Kollmorgen AKM21E-ANBNC-00 servo motor and the servo reducer 44 may be a Wittenstein 10:1 servo reducer, although other types of motors and reducers may be used. The prime mover assembly 16 may be solely supported by or cantilevered from the motor mounting plate 45, and the motor mounting plate may be mounted on a load plate 50 so that the weight of the prime mover assembly 16, the container carrier assembly 14, and the container C may be borne by the load plate 50. Interfaces to and from the prime mover assembly 16 are created by electronic connection of cable assemblies directly in-line with the system control hardware. The servo reducer 44 may have an output shaft 49 that is coupled to the rotatable container carrier assembly 14 by an output shaft coupling 48, best seen in FIG. 4.

Figure 2:
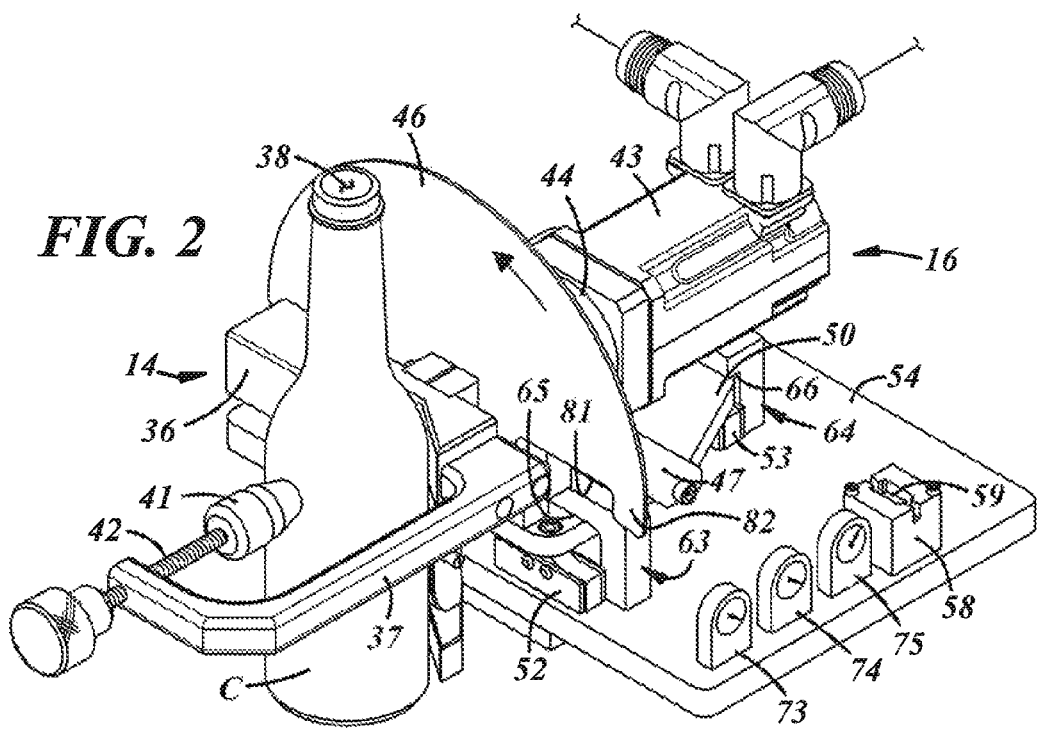
FIG. 2 is a front perspective view of a rotatable container carrier assembly and a prime mover assembly of the apparatus of FIG. 1.

A sensor flag 46 comprising flat rigid material may be coupled to the output shaft 49 of the servo motor 43 and servo reducer 44 and may rotate with the output shaft 49. The material used for the flag may be a ferrous material such as steel, stainless steel or iron, or other ferrous material. If stainless material is used, the flag sensors 77 and 78 have to be positioned closer to the sensor flag 46 than if iron or steel is used in order to develop a suitable signal. The proximity of the sensor flag 46 in the position shown in FIGS. 2, 3, and 5 may be sensed by two flag sensors, a home flag sensor 77 and an overtravel flag sensor 78 as described more fully below, and may be used to locate the container carrier assembly 14 in first, or vertical home position as shown in FIGS. 2, 3, and 5.

Figure 6:
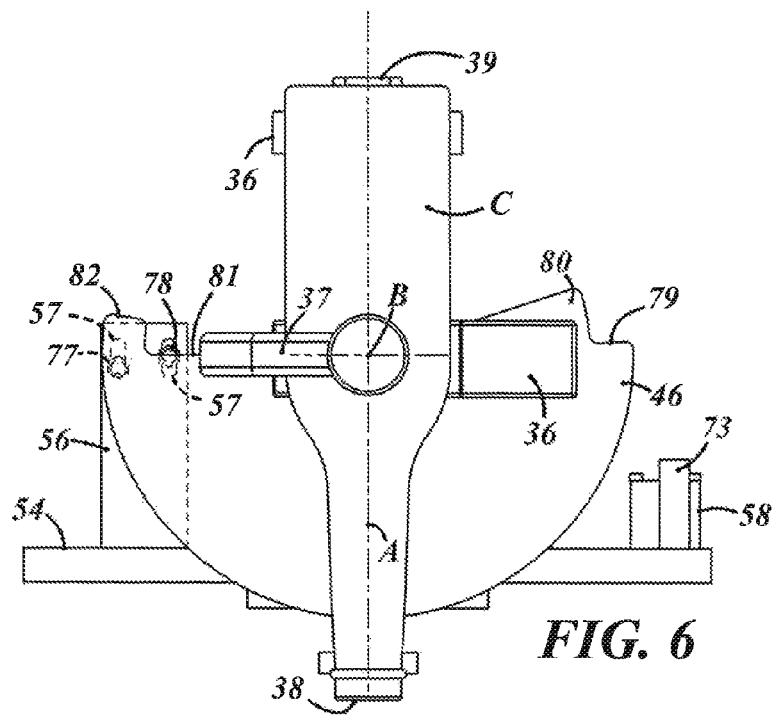
FIG. 6 is a front view of the apparatus of FIG. 2 showing the rotatable container carrier assembly in an inverted position.

As shown in FIG. 3, the sensor flag 46 may be formed with a home edge portion 79, a wedge portion 80, a notch portion 81, and a tail portion 82 all of which may be sensed by the two flag sensors 77 and 78. The home flag sensor 77 may be used to sense the home edge portion 79 of the sensor flag 46 to develop a signal in a controller 60 as described more fully below indicating that the sensor flag 46 is in a home position. As the sensor flag 46 rotates counterclockwise to a position where the home edge portion 79 is approaching the home flag sensor 77, the wedge portion 80 of the sensor flag 46 first covers the overtravel sensor 78 and then home edge portion 79 begins to cover the home flag sensor 77. This sequence of signals may be used by the controller 60 to determine the home position of the container assembly 14, and also may be used to indicate which portion of the sensor flag 46 is being sensed by the sensors 77 and 78. Continued rotation of the sensor flag 46 in a counterclockwise direction approximately 180° from the home position as shown in FIG. 3 causes the notch portion 81 of the sensor flag 46 to uncover the overtravel sensor 78 while the tail portion 82 of the sensor flag 46 is still covering the home flag sensor 77 as shown in FIG. 6. This combination of signals may be used by the controller 60 to indicate that the container assembly 14 is in the second or inverted position and the sensor flag 46 is in the position shown in FIG. 6. This signal may also be used to indicate to the controller 60 that the container carrier assembly 14 should next be rotated clockwise to return the container carrier assembly 14 to the first or home position as shown in FIG. 3. The rotatable container carrier assembly 14 including the backrest 40 and the movable clamp 41 may be designed to carry the container C so that the longitudinal axis A of the container C is intersected by the axis of rotation B of the output shaft 49 of the servo reducer 44. Drive mount straps 47 may be bolted or otherwise fixed at one end to the motor mounting plate 45 and at the other end to the load plate 50 to brace the motor mounting plate 45 in a vertical orientation that is perpendicular to the load plate 50.

Figure 7:
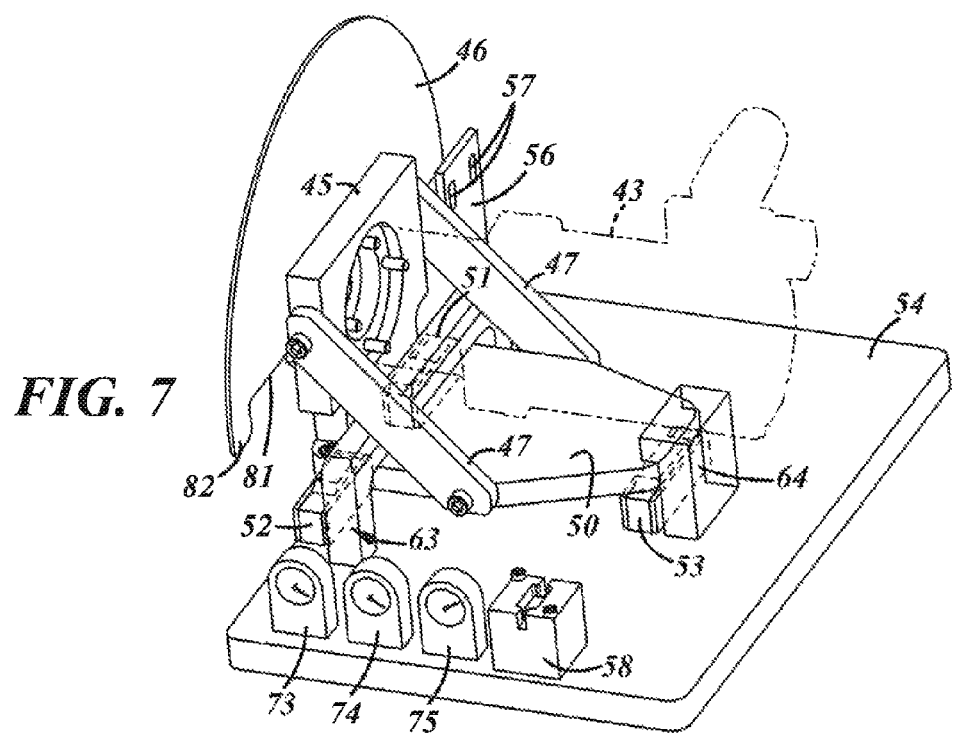
FIG. 7 is a front perspective view of a rotatable container carrier assembly and a prime mover assembly of the apparatus of FIG. 1.

The load plate 50 may be supported by a plurality of load cells 51-53 on a base plate 54. The base plate 54 may be solidly mounted to the frame structure of the upper cabinet assembly 12. In the embodiment shown, three load cells are used, two of the load cells 51 and 52 may be positioned under the front of the load plate 50 as shown in FIGS. 3 and 4, and one of the load cells 53 may be positioned under the rear portion of the load plate 50 as shown in FIGS. 5 and 7. Other numbers of load cells in other positions may be used to support the load plate 50 on the base plate 54. The load cells 51-53 may be Interface SML-5-654 type load cells, or other types of load cells may be used.

As shown in FIGS. 3-5 and 7, a sensor support bracket 56 may be used to support the flag sensors 77 and 78 in proximity to the sensor flag 46. The flag sensors 77 and 78 may be inductive sensors Bi-EG05-AP6X-V1331 available from Turek, or other suitable sensor for sensing the rotation of the sensor flag 46. The flag sensors 77 and 78 may be mounted in vertical slots 57 in the sensor bracket 56 so that the vertical position of the sensors 77 and 78 may be precisely adjusted. One or more ambient condition sensors may be provided to measure and record ambient conditions during the operation of the fluid flow test apparatus. An accelerometer 59 may be mounted in an accelerometer mount 58 that may be mounted on the base plate 54. The accelerometer 59 may monitor one or more axis to detect ambient vibration and/or shock that may occur during operation of the apparatus. A thermometer 73, a barometer 74, and a hygrometer 75 may also be mounted on the base plate 54 to record the ambient temperature, pressure and humidity, respectively, at the time that fluid flow tests are being conducted. Alternatively, one or more of the ambient sensors may be remotely mounted in a location other than on the base plate assembly 54, in the upper cabinet 12, or in the lower cabinet 11, as desired.

FIG. 6 is a front view of the apparatus of FIG. 2 showing the rotatable container clamp assembly in an inverted position, rotated one hundred and eighty degrees from the position shown in FIGS. 2 and 3. In this position, the notch 81 of the sensor flag is in horizontal alignment with the overtravel sensor 78, and the tail portion 82 is covering the home position sensor 77. This combination of signals from the home position sensor 77 and the overtravel sensor 78 will be interpreted by the controller 60 to indicate that the sensor flag has rotated to the position shown in FIG. 6, and the container C is in an inverted position.

Figure 8:
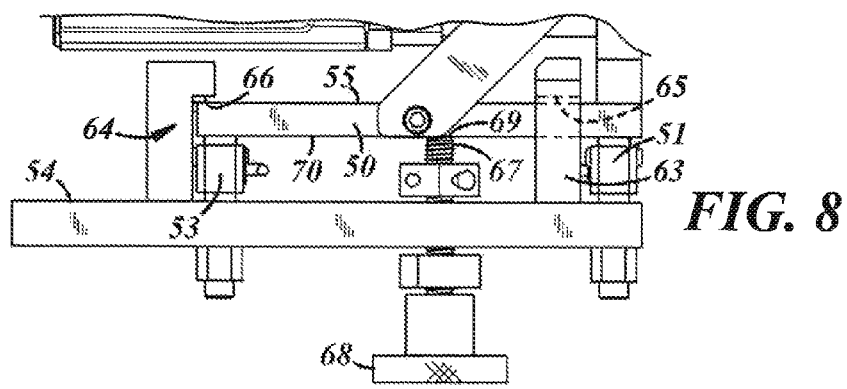
FIG. 8 is a detail view showing the load plate resting on the load cells.
Figure 9:
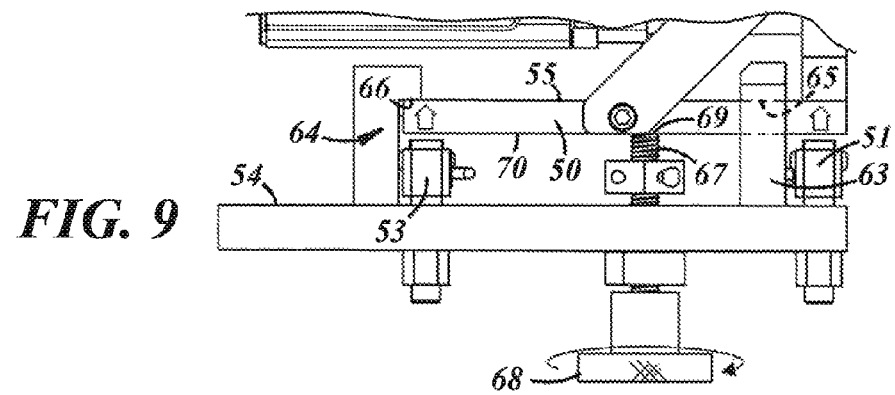
FIG. 9 is a detail view similar to FIG. 8 but showing the load plate lifted off of the load cells.

As shown in FIGS. 8 and 9, front and rear restraint brackets 63 and 64, respectively, may be mounted on the base plate 54 to immobilize the load plate 50 so that the apparatus can be moved from one location to another while protecting the load cells 51-53. The restraint brackets 63 and 64 may each have an abutment portion 65 and 66 respectively, which is above the upper surface 55 of the load plate 50 as shown in FIG. 8. In this position, the load plate 50 is supported by the load cells 51-53 and is free to vibrate in response to vibration of the container carrier assembly 14. A threaded shaft 67 having a knurled nut 68 on one end and a pressure tip 69 on the other may be threaded through the base plate 54 so that the pressure tip 69 may be brought into contact with the underside of the load plate 50. During normal operation of the apparatus, the pressure tip 69 is spaced from the underside 70 of the load plate 50, and the abutment portions 65 and 66 are spaced from the upper surface of the load plate 50, allowing the load plate 50 to vibrate freely. When it is desired to move the apparatus 10 from one location to another, the knurled nut 68 is used to tighten the pressure tip 69 against the underside 70 of the load plate 50, lifting the load plate 50 off of the load cells 51-53, and pressing the upper surface 55 of the load plate 50 into contact with the abutment portions 65 and 66 of the restraint brackets 63 and 64 as shown in FIG. 9. This clamps the load plate 50 against the restraint brackets 63 and 64 and protects the load cells 51-53 from excessive vibration from the load plate 50.

Figure 10:
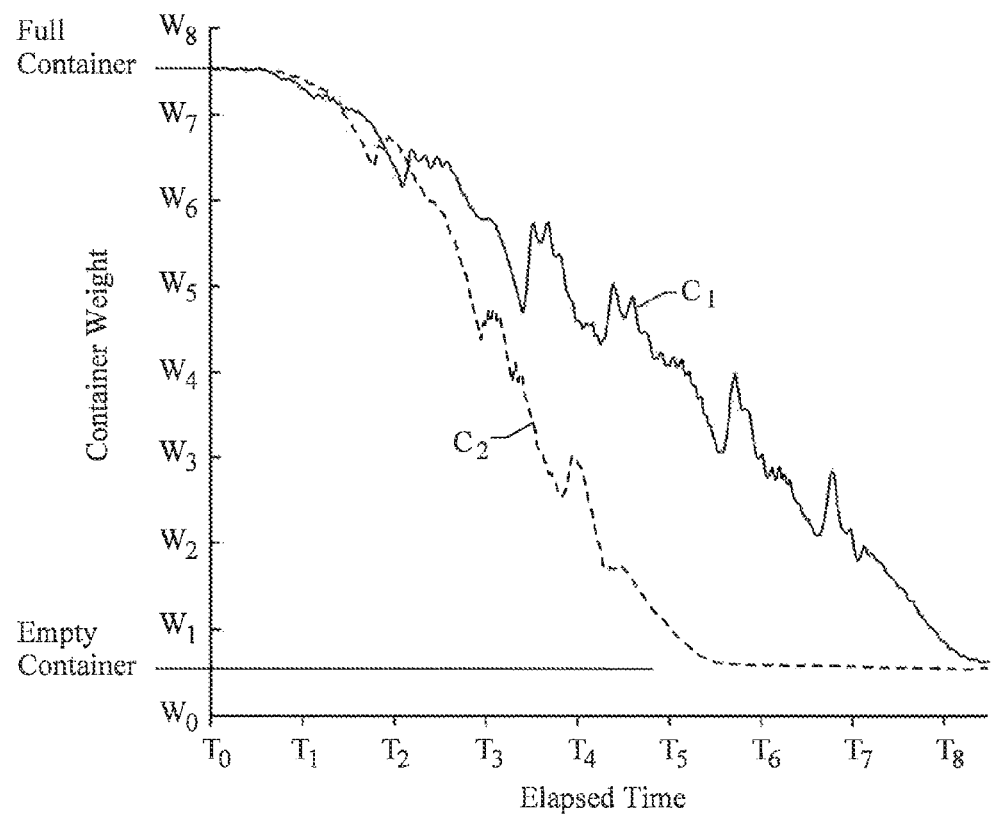
FIG. 10 is a graph showing the change of weight over time for two containers $C_1$ and $C_2$.

FIG. 10 is a graph showing the change of weight over time for two containers $C_1$ and $C_2$ that contain fluid as a result of the containers being rotated from an upright position to an inverted position as the fluid contents flow out of the container. The size of the mouth opening for container $C_1$ is smaller than the mouth opening for the container $C_2$. Container Weight (the weight of the container plus the fluid contents) is plotted on the Y-axis, and the Elapsed Time to empty the fluid from the container from the time that the container is put into an inverted position is plotted on the X-axis. Each of the containers $C_1$ and $C_2$ contains the same amount of fluid at the beginning of the test, and each of the containers $C_1$ and $C_2$ is empty at the end of the test. Container $C_1$ takes a longer period of time to reach an empty condition than container $C_2$. The weight of each of the containers $C_1$ and $C_2$ is measured by the load cells 51-53 as described above. As shown, a graph showing the change in weight of the containers including fluid contents as the fluid is poured out of containers $C_1$ and $C_2$ is not a smooth curve, but is an overall decreasing curve having brief periods of increase along the way. The duration and the amplitude of the periods of increase are an indication of the disruption in the smooth flow of liquid from the containers caused by the ingress of air into the container as fluid is poured from the container. It is believed that the ingress of air into the container may cause some of the fluid in the container to become airborne; when the fluid settles back down into the container, it is registered as a weight gain. The interruption in flow or "glugging" from the container may or may not be a desirable characteristic of the container depending on the type of fluid contained in the container, and the type of flow that is being sought. The graph of the change of weight of the containers with fluid C1 and C2 over time is a pour profile of the containers C1 and C2.

Figure 11:
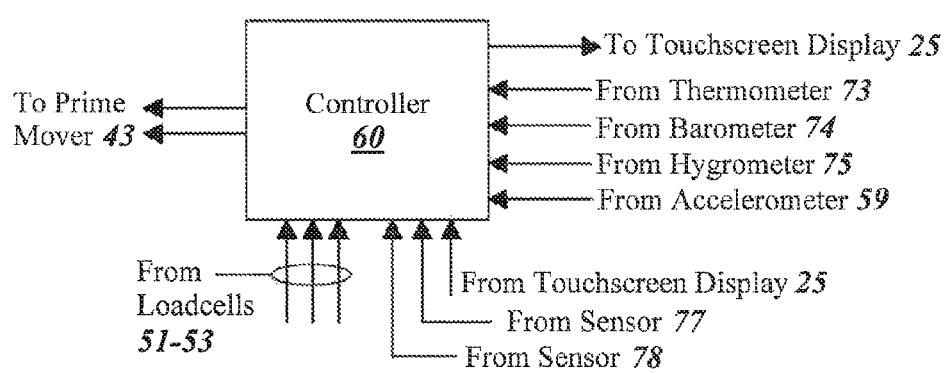
FIG. 11 is a schematic drawing of a controller for the apparatus of FIGS. 1-9.

FIG. 11 is a schematic drawing of a controller 60 for the apparatus of FIGS. 1-6. The controller 60 may be a National Instruments cRio type controller. The controller may receive signals from the touch screen computer 25 representing input command signals from an operator conducting pour tests on a container C using the apparatus. The controller 60 may send signals to the prime mover 43 causing the prime mover to rotate the container carrier assembly 14 with a container C from an upright to an inverted position suitable for evacuating the contents from the container. The controller 60 may also control the rate of rotation of the container carrier assembly 14 depending on the signals that are input by the operator. The controller 60 may receive command signals from the touch screen 25, and data input signals from the load cells 51-53, from the accelerometer 59, from the thermometer 73, from the barometer 74, from the hygrometer 75, and from the flag sensors 77 and 78. The signals from the flag sensors 77 and 78 may indicate when the sensor flag is in the upright or first position shown in FIGS. 2, 3, and 5, when it has rotated to the inverted or second position shown in FIG. 6, and when it has returned to the home upright position. The signals from the accelerometer 59 may indicate the occurrence of an unacceptable environmental seismic anomaly such as a vibration or shock that has been induced onto the system which could detrimentally affect the test results.

In operation, a container C containing a liquid may be positioned on the lower support shelf 39 of the container carrier assembly 14 and the pressure member 41 may be tightened to secure the container C in place against the backrest 40 in a first or upright position allowing fluid to be retained within the container. A suitable set of commands may then input into the assembly via the touch screen computer 25 specifying the number of degrees to rotate the container C from an upright or first position in which fluid is retained within the container to an inverted or second position causing fluid to be poured from the container, and the speed of angular rotation. The pouring of fluid from the container C is sensed by the load cells 51-53 that support the load plate 50, and is sent to the controller 60. The change of weight of the container and fluid C over time is used to generate a graph as shown in FIG. 10 that is the pour profile of the container C. As an example only, the container C may be rotated 180 degrees from an upright position to an inverted position 180° from the upright position, and the speed of angular rotation may be forty five degrees per second. As a result, the container C is rotated from an upright to an inverted position over a period of four seconds. Other degrees of rotation and speeds of rotation may be selected and the pour results measured. The results may be displayed on the touch screen computer 25. The pour profile may be compared to the pour profiles of other containers having different shapes and capacities to determine which containers pour faster or slower, smoother or with more agitation or glugging, etc, as shown by the graphs of the containers C1 and C2 of FIG. 10. Once a test is completed, the system may calculate and export one or more test data files to a unique directory location for segregating the test data from other container tests. The files may include a summary graph of the test output, a raw data file in a compatible file format, such as CSV for import into a statistical and graphing computer program, a summary of the test profile parameters used for the specific test, and other data related to the tests.

The invention is also directed to a method of testing characteristics of fluid flow out of a container, and may include the following steps:

1) Adding a predetermined amount of liquid to a container C;

2) Coupling the container C to the rotatable container carrier assembly 14 in a first or upright position, and with a center of gravity of the filled container C in approximate alignment with a rotational axis B of the container carrier assembly 14;

3) Zeroing the load cells 51-53 to tare the system;

4) Activating a servo motor 43 coupled to the container carrier assembly 14 to rotate the container carrier assembly 14 and container C about the rotational axis B of the servo motor 43 to an inverted or second position at a desired rotation angle and at a predetermined velocity; and 5) Sensing a change in weight of the container C and its contents over time and recording the data to establish a pour profile for the container C.

In general, the controller 60 mentioned above may be used to carry out various aspects of the presently disclosed method. In one example, the controller 60 may receive input data and instructions from a user via the touch screen 25, process the received input in light of stored software and/or data, and transmit output signals to the to the prime mover 43 and the display on the touch screen 25. The controller 60 may also receive input signals from the ambient temperature, pressure and humidity sensors 73, 74, and 75, respectively, from the accelerometer 59, from the sensor flag position flag sensors 77 and 78, from the load cells 51-53, and from any other suitable portions of the system 10, process the received input signals in light of stored data and software, and transmit output data to the user, for example, via the touch screen display 25.

Although not separately illustrated, the controller 60 generally may include memory, a processor coupled to the memory, one or more interfaces coupled to the processor, one or more input devices coupled to the processor, and/or one or more output devices coupled to the processor. Of course, the controller 60 further may include any ancillary devices, for example, clocks, internal power supplies, and the like (not shown). Although not shown, the controller 60 may be supplied with electricity by an external power supply, for example, an AC to DC transformer, one or more batteries, fuel cells, and the like.

The various input devices and output devices may be separate or integrated, and may be used to receive or transmit any suitable user input or output, whether tactile, audible, and/or visual. The input devices may include peripheral input devices or user input devices, for example, a pointing device (e.g., a mouse, trackball, pen, touch pad, touch screen, joystick, and the like), keyboard, microphone, camera, and/or the like. The input devices may be used to communicate any suitable commands, instructions, data, information, signals, and the like into the processor. The output devices may include user output devices, for example, audio speakers or earphones, or a monitor or any other type of display device, or may include peripheral output devices, for example, a printer, a modem or any other communication adapter, and/or the like.

The interfaces may include internal and/or external communication interfaces and may include wired and/or wireless devices. For example, the interfaces may include an internal bus, which may provide for data communication between the processor, memory, and/or other interface elements of the controller 60. In another example, the interfaces may include an external bus for data communication between elements of the controller 60 and peripheral devices. The interfaces may include one or more of any of several types of bus structures, including a memory bus or memory controller, a peripheral bus, an accelerated graphics port, a local or processor bus, and using any of a variety of bus architectures. Also, the interfaces may include analog-to-digital or digital-to-analog converters, signal conditioners, amplifiers, filters, other electronic devices or software modules, and/or any other suitable interfaces. The interfaces may conform to, for example, RS-232, parallel, small computer system interface, universal serial bus, and/or any other suitable protocol(s). The interfaces may include circuits, software, firmware, and/or any other device to assist or enable the controller 60 in communicating internally and/or externally with other devices.

The processor may process data and execute instructions that provide at least some of the functionality for the test system. As used herein, the term instructions may include, for example, control logic, computer software and/or firmware, programmable instructions, or other suitable instructions. The processor may include, for example, one or more microprocessors, microcontrollers, discrete logic circuits having logic gates for implementing logic functions on data signals, application specific integrated circuits with suitable logic gates, programmable or complex programmable logic devices, programmable or field programmable gate arrays, and/or any other suitable type of electronic processing device(s).

The memory may include any computer readable medium or media configured to provide at least temporary storage of at least some data, data structures, an operating system, application programs, program modules or data, and/or other computer software or computer-readable instructions that provide at least some of the functionality of the system and that may be executed by the processor. The data, instructions, and the like may be stored, for example, as look-up tables, formulas, algorithms, maps, models, and/or any other suitable format. The memory may be in the form of removable and/or non-removable, volatile memory and/or non-volatile memory. Illustrative volatile memory may include, for example, random access memory (RAM), static RAM (SRAM), dynamic RAM (DRAM) including synchronous or asynchronous DRAM, and/or the like, for running software and data on the processor. By way of example, and not limitation, the volatile memory may include an operating system, application programs, other memory modules, and data. Illustrative non-volatile memory may include, for example, read only memory (ROM), erasable programmable ROM (EPROM), electrically erasable programmable ROM (EEPROM), dynamic read/write memory like magnetic or optical disks or tapes, and static read/write memory like flash memory, for storing software and data. Although not separately shown, the controller 60 may also include other removable/non-removable volatile/non-volatile data storage or media. For example, the other media may include dynamic or static external storage read/write device(s)

The methods or parts thereof can be implemented in a computer program product including instructions carried on a computer readable medium for use by one or more processors of one or more computers or controllers to implement one or more of the method steps. The computer program product may include one or more software programs comprised of program instructions in source code, object code, executable code or other formats; one or more firmware programs; or hardware description language (HIM) files; and any program related data. The data may include data structures, look-up tables, or data in any other suitable format. The program instructions may include program modules, routines, programs, objects, components, and/or the like. The computer program product can be executed on one computer or on multiple computers in communication with one another.

The program(s) can be embodied on non-transitory computer readable media, which can include one or more storage devices, articles of manufacture, or the like. Example non-transitory computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The non-transitory computer readable medium may also include computer to computer connections, for example, via a network or another communications connection (either wired, wireless, or a combination thereof). Non-transitory computer readable media include all computer readable media, with the sole exception of transitory propagating signals. Any combination(s) of the above examples is also included within the scope of the computer-readable media. It is therefore to be understood that the method(s) can be at least partially performed by any electronic articles and/or devices capable of executing instructions corresponding to one or more steps of the disclosed method(s).

It is therefore to be understood that the method may be at least partially performed by any electronic articles and/or devices capable of executing instructions corresponding to one or more steps of the disclosed method.

There thus has been disclosed a method and system to measure the flow of liquid from a container, for example, to measure the pour profile of the container, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A fluid flow testing apparatus comprising:
   a rotatable container carrier;
   an assembly that rotates the container between a first position allowing fluid to be retained within the container and a second position causing fluid to be poured from the container;
   sensors that sense the weight as fluid is poured from the container; and,
   a controller that receives input signals from the sensors to record the change in weight of the container over time as liquid is poured from the container as the container is rotated, wherein the change of weight of the container over time establishes a graphical pour profile for the container, such that graphical pour profiles of different containers are comparable to determine at least one of:
   which contains pour faster or slower, or
   which containers exhibit more glugging.

2. The apparatus of claim 1 further comprising:
   load cells for sensing the change of weight of the container comprising the sensors for sensing the weight of the container.

3. The apparatus of claim 1 further comprising:
   one or more ambient condition sensors to measure and record ambient conditions during the operation of the fluid flow test apparatus.

4. The apparatus of claim 3 further comprising:
   at least one of a temperature sensor, a barometric pressure sensor, a humidity sensor, or an accelerometer comprise the ambient condition sensors.

5. The apparatus of claim 1 further comprising:
   a collection assembly to receive fluid poured from the container.

6. The apparatus of claim 5 further comprising:
   a temperature sensor in the collection assembly for sensing the temperature of fluid poured from the container.

7. The apparatus of claim 1 further comprising:
   a prime mover comprising a portion of the assembly for rotating the container between a first position and a second position, wherein the prime mover is coupled to the rotatable container carrier.

8. The apparatus of claim 1 further comprising:
   a load plate for supporting the weight of the container carrier and the carrier; and,
   load cells supporting the load plate, wherein the load cells comprise the sensors for sensing the change of weight of the container and the pouring of fluid from the container.

9. The apparatus of claim 1 further comprising:
   a sensor flag coupled to the rotatable container carrier and rotating with the carrier; and,
   sensors on the apparatus for sensing the rotation of the sensor flag.

10. A fluid flow testing method comprising:
    positioning a first container in a rotatable container carrier;
    rotating the first container between a first position allowing fluid to be retained within the first container and a second position causing fluid to be poured from the first container;
    sensing the weight of the first container; and,
    recording a change in weight of the first container over time as liquid is poured from the first container as the first container is rotated in order to establish a first graphical pour profile for the first container,
    positioning a second container in the rotatable container carrier;
    rotating the second container between the first position allowing fluid to be retained within the second container and the second position causing fluid to be poured from the second container;
    sensing the weight of the second container;
    recording a change in weight of the second container over time as liquid is poured from the second container as the second container is rotated in order to establish a second graphical pour profile for the second container; and
    comparing the first and second graphical pour profiles to determine at least one of:
    which container pours faster or slower, or
    which container exhibits more glugging.

11. The method of claim 10 further comprising:
    sensing the change of weight of the container in order to sense the pouring of fluid from the container.

12. The method of claim 10 further comprising:
    measuring and recording ambient conditions during the operation of the fluid flow test apparatus using one or more ambient condition sensors.

13. The method of claim 12 further comprising:
measuring at least one of ambient vibrations, the ambient temperature, the barometric pressure, and the humidity in order to measure the ambient conditions.

14. The method of claim 10 further comprising:
receiving fluid poured from the container in a collection assembly.

15. The method of claim 14 further comprising:
sensing the temperature of fluid poured from the container using a temperature sensor in the collection assembly.

16. The method of claim 10 further comprising:
providing a prime mover in the assembly for rotating the container between a first position and a second position, coupling the prime mover to the rotatable container carrier in order to rotate the container between the first and second positions.

17. The method of claim 10 further comprising:
supporting the weight of the container carrier and the container on a load plate;
supporting the load plate on load cells; and,
sensing the change of weight of the container as fluid is poured from the container using the load cells.

18. The method of claim 10 further comprising:
mounting a sensor flag on the rotatable container carrier;
rotating the sensor flag with the carrier; and,
sensing the rotation of the sensor flag.

* * * * *